United States Patent [19]

Tanabe et al.

[11] Patent Number: 4,688,094
[45] Date of Patent: Aug. 18, 1987

[54] REFERENCE SIGNAL REPRODUCTION APPARATUS

[75] Inventors: Toshiyuki Tanabe, Ageo; Minoru Noguchi, Hanyu, both of Japan

[73] Assignee: Kabushiki Kaisha Toshiba, Kawasaki, Japan

[21] Appl. No.: 781,140

[22] Filed: Sep. 27, 1985

[30] Foreign Application Priority Data

Sep. 28, 1984 [JP] Japan .............................. 59-201917
Sep. 28, 1984 [JP] Japan .............................. 59-201918

[51] Int. Cl.⁴ .............................................. H04N 5/04
[52] U.S. Cl. .................................... 358/148; 358/158; 358/149; 375/120; 307/269; 307/514; 328/72; 328/155
[58] Field of Search ............... 358/148, 149, 150, 158, 358/159; 307/262, 269, 510, 514; 328/72, 155; 375/118, 119, 120

[56] References Cited

U.S. PATENT DOCUMENTS 3,936,762 2/1976 Cox, Jr. et al. ..................... 375/120
4,151,485 4/1979 LaFratta ............................. 375/120
4,423,520 12/1983 Murayama et al. ................. 375/120

FOREIGN PATENT DOCUMENTS 50-12857 5/1975 Japan .

OTHER PUBLICATIONS

TI Semiconductor Technical Data; SN 54LS297, SN 74LS297; by Japanese Texas Instruments Co., Ltd.; Nov. 1, 1983.

Primary Examiner—Michael A. Masinick
Assistant Examiner—Michael D. Parker
Attorney, Agent, or Firm—Cushman, Darby & Cushman

[57] ABSTRACT

The phase of a reproduction reference signal RS output from a decoder, which decodes the count value of the counter, is compared with that of an arriving horizontal synchronizing signal TH by a phase comparator. Based on this comparison result, a phase discriminating circuit discriminates whether the phase of the reproduction-reference signal RS is advanced, delayed or in-phase with the arriving horizontal synchronizing signal TH. Based on this phase discrimination result, the dividing ratio setting circuit sets the dividing ratio of the counter such that the reproduction reference signal TH is pulled in with the arriving horizontal synchronizing signal TH.

15 Claims, 8 Drawing Figures

FIG. 8

REFERENCE SIGNAL REPRODUCTION APPARATUS

BACKGROUND OF THE INVENTION

This invention relates to a reference signal reproduction apparatus for digitally reproducing a reference signal that is synchronous with an arriving reference signal.

Teletext systems in which digital signals are superposed in the vertical blanking interval of the television signal, and during the horizontal scan period, in which normally no picture signals are sent, have been developed. On the receiving side of such a teletext system, image data such as characters and graphics included in a superposed digital signal (hereinafter referred to as a character transmission signal) are extracted and displayed on the CRT, etc. In general, the horizontal synchronizing signal of the television signal is used as the reference for extracting the above character broadcasting signal.

In order to obtain this horizontal sychronizing signal, a synchronizing AFC circuit, which is described in pages 168 to 176 of the COLOR TELEVISION TEXTBOOK, Oct. 20, 1978, Japan Broadcasting Publishing Assoc. was used in the past. The horizontal synchronizing signal reproduced by this circuit however, does not have accurate phase in the vertical blanking interval because of the effect of the vertical synchronizing signal. Consequently, when the superposed character broadcasting signal included in the vertical blanking interval is extracted, it is not possible to correctly extract the character broadcasting signal using the horizontal synchronizing signal reproduced by the synchronizing AFC circuit.

SUMMARY OF THE INVENTION

The object of this invention is to provide a reference signal reproduction device which can reproduce a stable reference signal in-phase with an arriving reference signal.

In order to accomplish the above object, the phases of the reproduction reference signal applied as a decode output of a counter and the arriving reference signal are phase-compared, the phase of the reproduced reference signal in relation to the arriving reference signal is discriminated by three modes, i.e. delay, advance or in phase based on this phase comparison result, and the counter division ratio is set, based on this discrimination, such that the phase of the reproduction reference signal is pulled into that of the arriving reference signal.

BRIEF DESCRIPTION OF THE DRAWINGS

This invention may be better understood with reference to the drawings in which.

DETAILED DESCRIPTION OF THE PREFERRED EMBODIMENT

The following is a description in conjunction with the drawings of the embodiment of the reference signal reproduction device according to this invention as applied to a character broadcasting apparatus.

Figure 1:
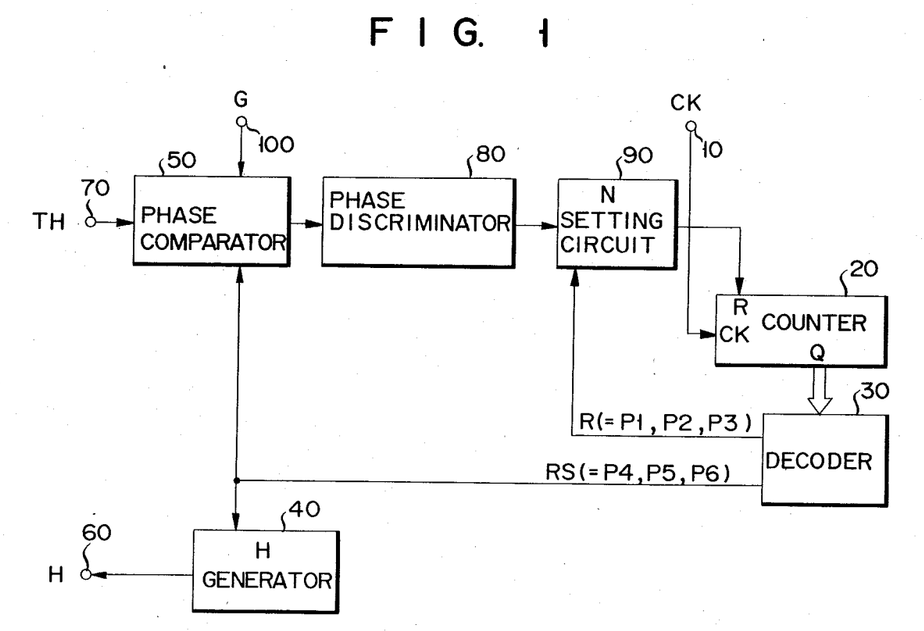
FIG. 1 is a schematic of one embodiment of this invention.

FIG. 1 is a schematic representation of the structure of one embodiment of this invention. In the drawing, a clock CK of 8/5 fsc (fsc: color subcarrier frequency), which is the reference for sampling the received character broadcasting signal, is applied to terminal 10. This clock CK is also supplied to counter 20 and is divided by a prescribed ratio (N). The count value Q of the division in counter 20 is applied to decoder 30, which decodes the value and generates a reproduction reference signal RS and a reset signal R.

Reproduction reference signal RS is supplied to signal generator 40 and phase comparator 50. Generator 40 generates a reproduction horizontal synchronizing signal H based on reproduction reference signal RS. This signal RS is led to terminal 60. Phase comparator 50 compares the phases of reproduction reference signal RS and the received horizontal synchronizing signal (arriving reference signal TH) applied to terminal 60, and sends the result of the comparison to phase discriminator 80.

Based on the comparison result supplied from phase comparator 50, phase discriminator 80 discriminates whether the phase of the reproduction reference signal RS is in the advanced, delayed or in-phase mode in relation to the received horizontal synchronizing signal TH. The result of this discrimination is sent to division setting circuit 90. Based on this result, the circuit 90 sets the division ratio of counter 20 such that the reproduction reference signal RS is pulled into the received horizontal synchronizing signal TH by using the reset signal R. As a result signal RS synchronizing with the arriving horizontal synchronizing signal TH is obtained and, thereby the reproduction horizontal synchronizing signal H that is synchronizing with the signal TH is obtained.

Signal G, which is supplied to phase comparator 50 via terminal 100, is the vertical synchronizing gate signal output during the vertical synchronizing signal period. The phase comparator 50 in accordance with signal G outputs the same phase comparison result as in the in-phase mode without comparing phases during the vertical synchronizing signal period and, thereby, dividing ratio N that is the same as in the in-phase mode is set in the vertical synchronizing signal period.

Figure 2:
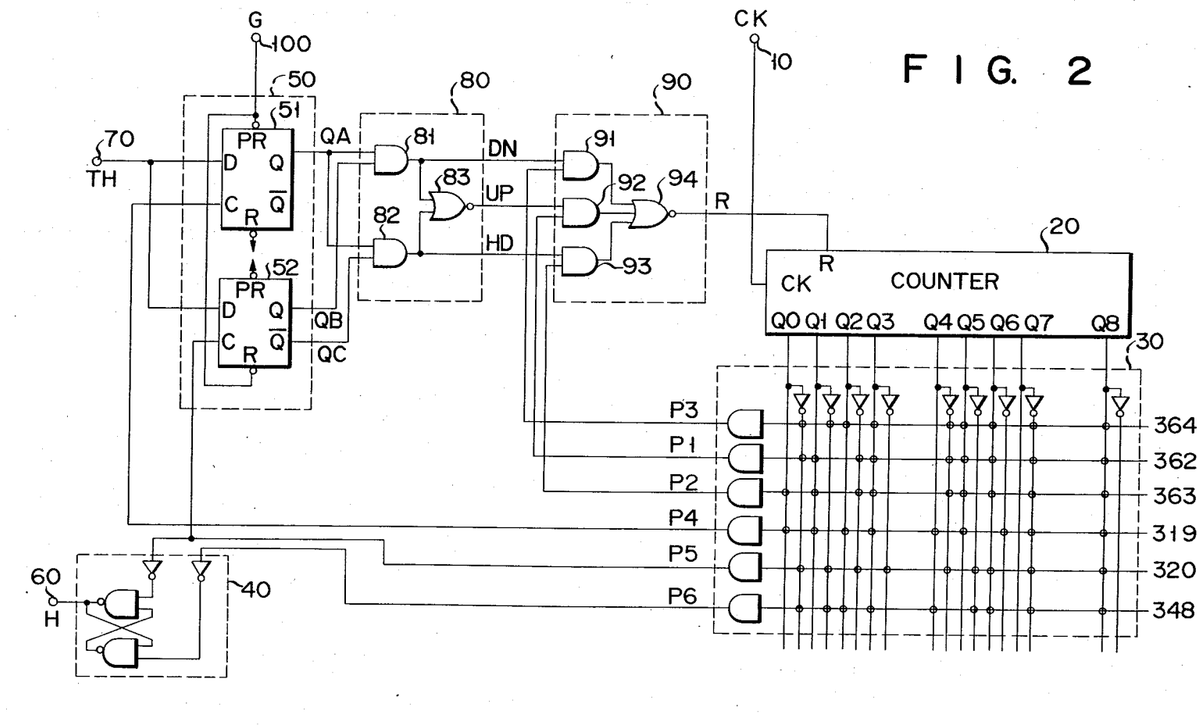
FIG. 2 is a circuit diagram of an actual example of the structure shown in FIG. 1.

The above was a summary of the preferred embodiment of this invention. The following is detailed description of the structure and operation based on FIG. 2. FIG. 2 shows an actual example of the device shown in FIG. 1 and the same reference numerals have been used for the same parts.

In FIG. 2 decoder 30 outputs three signals P4, P5, P6 as the reproduction reference signal RS and outputs three signals P1, P2, P3 as the reset signal R. Reproduction horizontal synchronizing signal generator 40 is composed as flip-flop circuits and outputs reproduction horizontal synchronizing signal H based on signals P5 and P6.

Phase comparator 50 comprises flip-flop circuits 51, 52 which latch the level (polarity) of received horizontal synchronizing signal TH at the edge timing of signals P4 and P5, respectively. Based on the level of signal TH, which is detected in this way, phase discriminator 80 discriminates which mode it is, and dividing ratio setting circuit 90 sets the dividing ratio N of counter 20 accordingly.

Normally, counter 20 divides the clock CK by 364. As 8/5 fsc and $f_H$ ($f_H$: horizontal frequency) have the following relationship, it is possible to obtain the signals P1–P6 in horizontal period by dividing by 364.

$$8/5\ fsc = 364 \cdot f_H \qquad (1)$$

Then, by setting the dividing ratio to 363, 365 the relative phase of the arriving horizontal synchronizing signal TH and the reproduction reference signal RS can be corrected.

Figure 3:
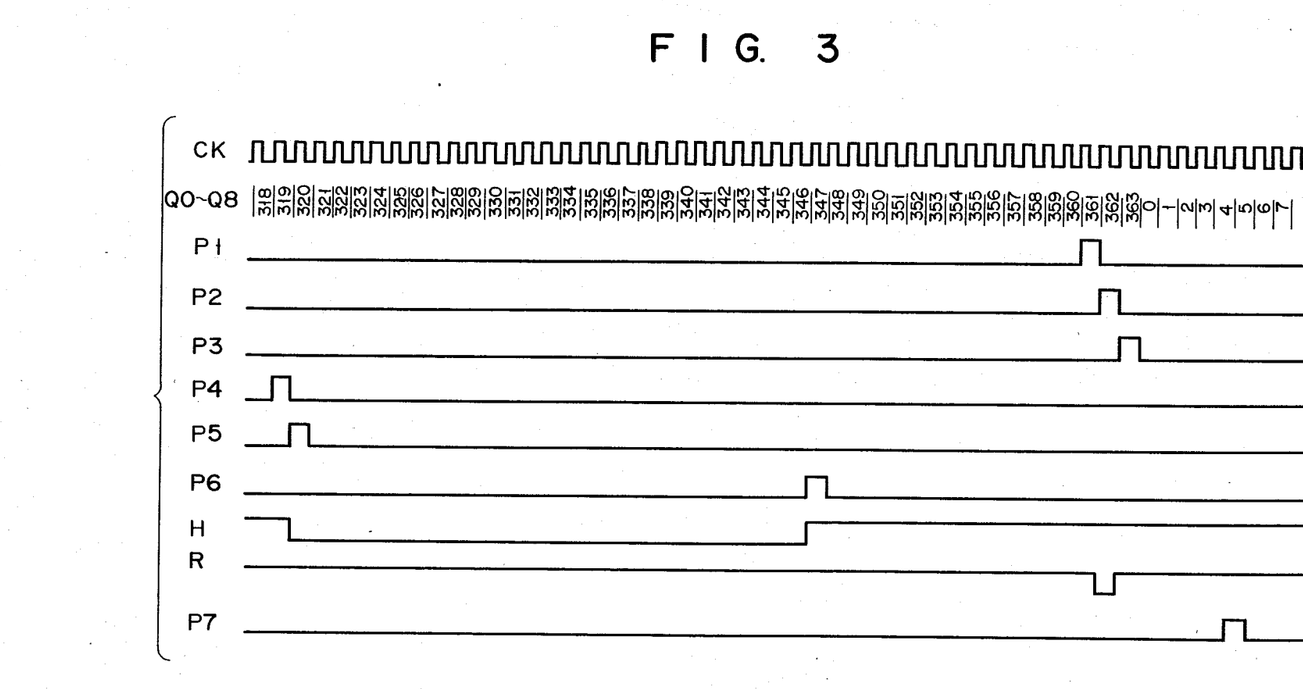
FIGS. 3-6 are timing charts showing the operation of the device shown in FIG. 2.

A description of the operation of FIG. 2 is given in conjunction with the timing chart of FIG. 3.

Counter 20 counts the 8/5 fsc clock CK (See FIG. 3.) and outputs Q0–Q8. This output is shown in decimal numbers in FIG. 3. Decoder 30 decodes outputs Q0–Q8 and outputs signals P1–P6. Reset signals P1–P3 have a mutual phase difference of one cycle of the reference clock CK and can each set the dividing ratio of counter 20 to 363, 364, 365.

Flip-flop circuits 51, 52, using signals P4, P5 output from decoder 30 as clocks, latch signal TH supplied to terminal 70. Accordingly, the polarity (level) of the received horizontal synchronizing signal TH at the leading edge of signals P4, P5 is detected by flip-flop circuits 51, 52. As shown in FIG. 3, signals P4, P5 are obtained when the count value of counter 20 reaches 319, 320, respectively. Accordingly, a change of polarity of signal TH is detected in within one clock.

Based on this polarity detection performed by flip-flop circuits 51, 52, phase discrimination circuit 80 discriminates the phase of received horizontal synchronizing signal TH in relation to reproduction reference signal RS. For example, in the phase mode shown in FIG. 4, i.e., when signal TH is delayed than signals P4, P5, as outputs QA, QB of the flip-flop circuits 51, 52 are both high level H, a discrimination signal DN indicative of the advanced mode is obtained from AND gate 81. In the phase mode shown in FIG. 5, i.e., when trailing edge of signal TH exists between signals P4 and P5, as output QA of flip-flop circuit 51 is level H and output QB of flip-flop circuit 52 is low level L, a discrimination signal HD indicative of the in-phase mode is obtained from AND gate 82 to which output QA of flip-flop 51 and output QC of flip-flop 52 are input. In the phase mode shown in FIG. 6, i.e., signal TH is advanced of signals P4, P5, as outputs QA, QB of flip-flop circuits 51, 52 are both low level L, the outputs of AND gates 81, 82 are L and a signal UP indicative of the delayed mode is obtained from AND gate 83.

Dividing ratio setting circuit 90 sets the dividing ratio N of counter 20 based on the three signals DN, UP, HD from phase discriminator 80. Signals P1, P2, P3 are selected by AND gates 92, 93, 91 using signals UP, HD, DN, respectively, and supplied to counter 20 via NOR gate 94 as the reset signal R (FIG. 3). For example, when signal UP is obtained, the signal P1, which is obtained when the count value of counter 20 reaches 362, is selected, inverted by NOR gate 94, and supplied to the reset terminal of counter 20 so counter 20 is reset at the time when the count value reaches 362. Accordingly, counter 20 divides the clock CK by 363 so the phase of signals P4, P5 is advanced, pulling signals P4, P5, which have phases that are later than the signal TH, ahead. FIG. 3 shows the case where signal P2 is selected as the reset signal R by signal HD.

Figure 4:
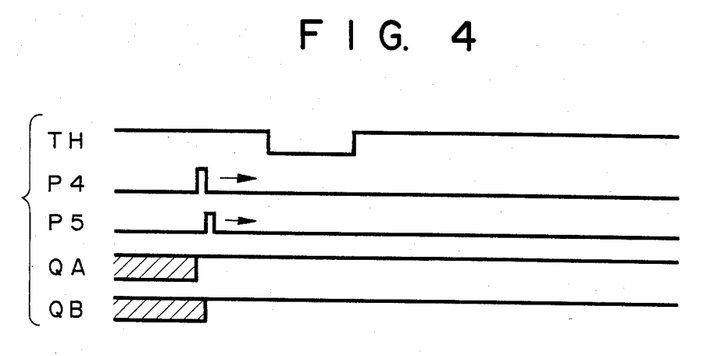
Figure 5:
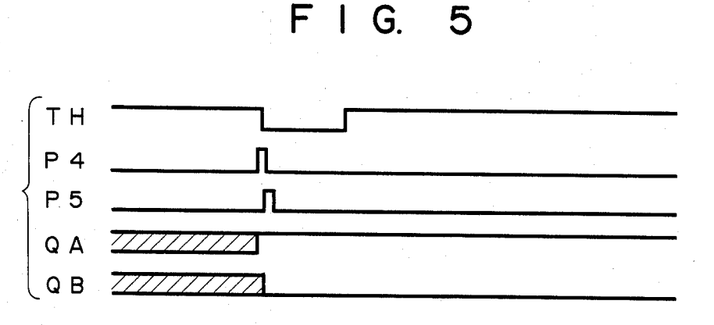
Figure 6:
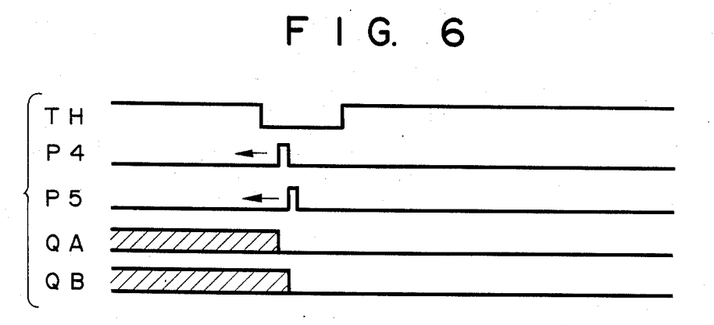

The following is a description with reference to FIGS. 4–6 of the operation of phase pull-in. As is shown in FIG. 4, when the phase of signals P4, P5 leads that of signal TH, signal DN is obtained from phase discriminator 80 and counter 20 is reset by signal P3. As a result, dividing ratio is set at 365. Accordingly, the phases of signals P4, P5 are delayed and, therefore, the phase difference is reduced and the signals P4, P5 are matched with signal TH. On the other hand, as is shown in FIG. 6, when the phase is relatively delayed, counter 20 continues the phase pull-in operation at 363.

As shown in FIG. 5, when the phases match, counter 20 normally continues the operation at 364 so the operation is completed and unevenness of the phases is eliminated.

The vertical synchronizing gate signal G supplied to terminal 100 is supplied to the preset and reset terminals of flip-flop circuits 51, 52. Signal G becomes L during the vertical synchronizing signal period so output QA of flip-flop circuit 51 during this period is "H", output QB of flip-flop circuit 52 is "L", and signal HD is output from phase discriminator 80. Thus, reproduction reference signal RS is not influenced by the cut-off and equalizing pulses in the vertical synchronizing signal period and no variation in the phase occurs.

As was described above, in this embodiment the phase mode is discriminated to be either advanced, delayed or in-phase, and in the in-phase mode the dividing ratio is set at 364. Therefore, once the phase is matched, as it does not vary, it is possible to obtain a stable reproduction reference signal RS. Accordingly, the signal H obtained from this signal RS is phase synchronous with the signal TH and, therefore it is possible to stably extract the character broadcasting signal.

There is also no influence of the equalizing and cut-off pulses during the vertical synchronizing signal period because the pulling-in operation is cut off by vertical synchronizing gate signal G.

The another embodiment of the invention is described with reference to FIG. 7 in which the same parts as in FIG. 2 have been given the same reference numerals.

In the previous embodiment, it was explained how the dividing ratio N of counter 20 is controlled each time the received horizontal synchronizing signal TH arrives. In the embodiment shown in FIG. 7, on the other hand, the discrimination signals DN, UP, HD for three modes are digitally integrated, and when this integrated output satisfies a specific condition, the signals become effective (are enabled) for the first time.

Figure 7:
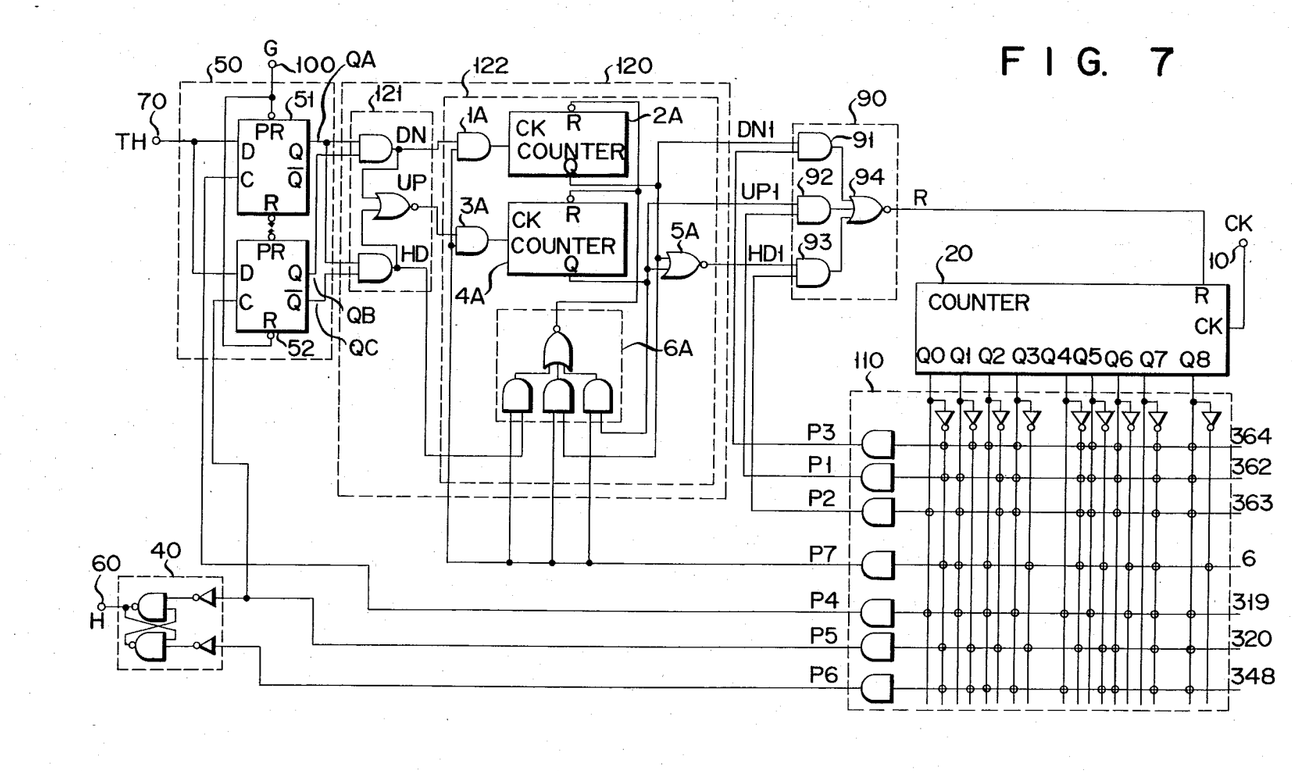
FIG. 7 is a circuit diagram of another embodiment of this invention.

In FIG. 7 the difference from FIG. 2 lies in decoder 110 and phase discriminator 120. Decoder 110 outputs signal P7 as well as signals P1–P6. Phase discriminator 120 comprises first phase discriminator 121 and second phase discriminator 122. First phase discriminator 120 is constructed exactly the same as phase discriminator 80 of FIG. 2 and performs the same operation. Second phase discriminator 122 digitally integrates the discrimination output of first phase discriminator 121 and, based on the integration result, sends a correct discrimination output to dividing ratio setting circuit 90.

The following is a description of the structure and operation of the second phase discriminator 122.

Of the three discrimination signals DN, UP, HD output from first phase discriminator 121, the repetition of signals DN, UP is detected by counters 2A, 4A, respectively. Namely, when signal DN or UP is obtained, AND gate 1A or 3A is opened, and signal P7 from decoder 110 is suppled to counter 2A or 4A as the count clock.

Counter 2A or 4A first enables signal DN or UP when, for example, the count value becomes 8, and sends the corresponding signals DN1 or UP1 to dividing ration setting circuit 90. When, on the other hand, neither signal DN1 nor UP1 is output, signal HD1 indicating the in-phase mode is obtained from NOR gate 5A to dividing ratio setting circuit 90.

Reset circuit 6A resets counters 2A and 4A with signal P7 when signals DN1, UP1 are output and when signal HD is output from first phase discriminator 121.

The operation of pulling-in the phases using the structure mentioned above is described with reference to drawings 4-6.

FIG. 4 shows a case where signals P4, P5 lead signal TH. In this case, signal DN indicating the advanced mode is output from first phase discriminator 121. Second phase discriminator 122 outputs a signal HD1 showing the in-phase mode until signal DN has been repeatedly output eight times. Accordingly, in this case, circuit 90 selects signal P2 and the dividing ratio of counter 20 is set at 364. On the other hand, when signal DN is repeatedly output eight times, second phase discriminator 122 outputs signal DN1 indicating the advanced mode. Thus, dividing ratio setting circuit 90 resets counter 20 with signal P3. Accordingly, the dividing ratio N of counter 20 is set at 365 and, thereby, signals P4, P5 are delayed. After this, counters 2A, 4A are reset by signals P7 and, thus, second phase discriminator 122 again detects the repetition of signal DN or UP. The dividing ratio of counter 20 is again switched from 365 to 364. Then, when signal DN is obtained repeatedly, the above operation is repeated, and finally the signals P4, P5 are synchronized with signal TH, as is shown in FIG. 5.

FIG. 6 shows the case where reproduction reference signal P4, P5 lag behind signal TH, and, except for the output of signals UP, UP1, this example is the same as in FIG. 4 so a description has been omitted.

With the above structure, when the HD signal indicating the in-phase mode is obtained from first phase discriminator 121, even if signal DN or UP have been output, as long as the number of outputs has not reached eight, second phase discriminator 122 will continue to output signal HD1 so it is possible to maintain a phase-locked state. Accordingly, in this embodiment when many noise components are included in the signal TH as during the presence of a weak electrical field, etc., the phase-locked state is not disturbed even if signals UP or DN are output erroneously from first phase discriminator 121.

Also, in this embodiment when the signal HD is obtained, signal HD1 is always output. That is, this embodiment does not detect the repetition of the signal HD. Accordingly, even if the phases of signals P4, P5 and signal TH match, there is no problem with performing the mistaken pulling-in process.

The still another embodiment is next described with reference to FIG. 8.

In the FIG. 7 embodiment, when the phase pulling-in operation was performed so that every time the signal DN or UP was detected, the repetition of the signal DN or UP was detected starting from the initial state.

In comparison, in this embodiment by detecting the repetition of signal HD as well as that of signals DN, UP, by performing the phase pulling-in operation from the time after the repetition of signals DN or UP have been checked by the time that of signal HD has been checked, the time period until phase locking is achieved is reduced.

Figure 8:
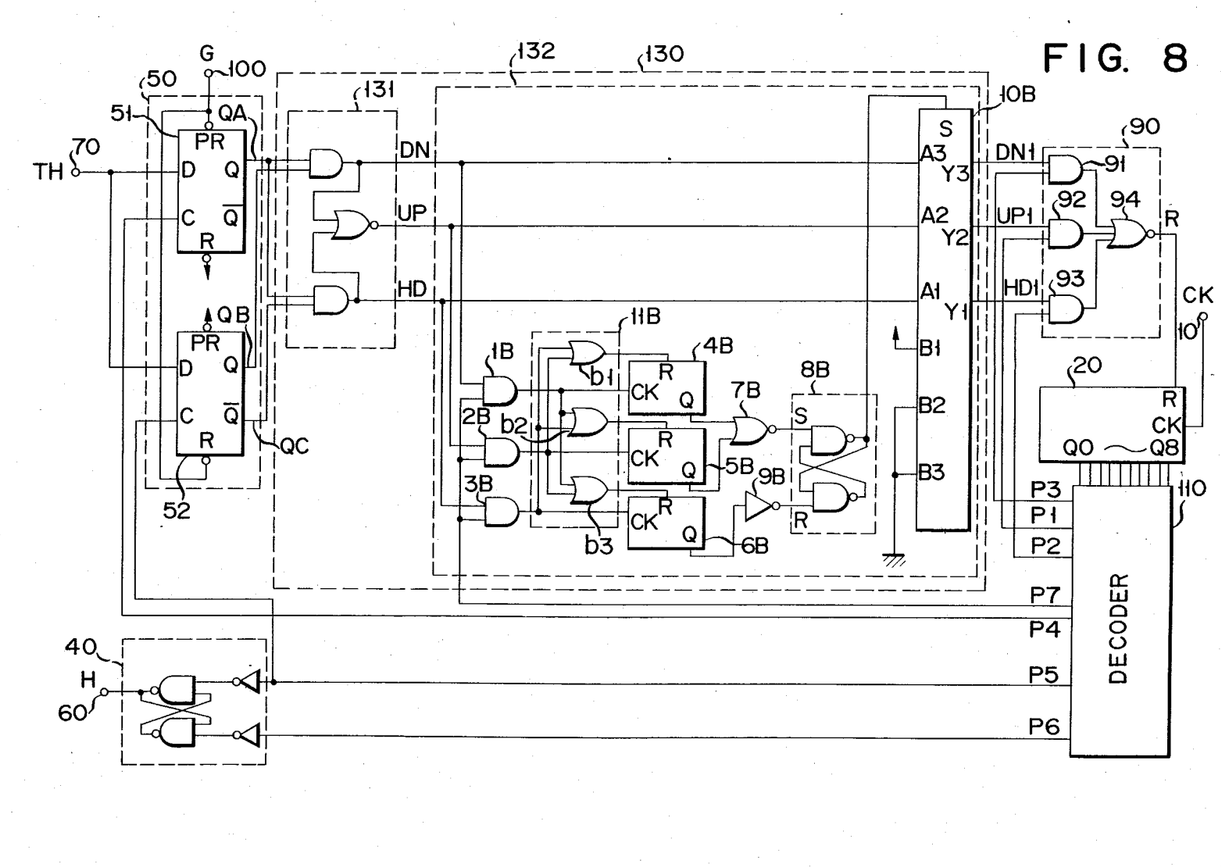
FIG. 8 is a circuit diagram of still another embodiment of this invention.

Phase discriminator 130 includes first and second phase discriminators 131, 132 as shown in FIG. 8. First phase discriminator 131 is the same as the first phase discriminator described in reference to FIG. 7, whereas, the second phase discriminator 132 also checks the repetition of signal HD as well as that of signals DN, UP. When signals DN, UP and HD are output from first phase discriminator 131, the gates of corresponding AND gates 1B, 2B, 3B are opened and counters 4B, 5B, 6B count signal P7.

When the state shown in FIG. 4 is repeated, counter 4B counts signal P7 and when the count of eight is reached the output becomes H. Similarly, when the states shown in FIG. 5 or 6 is repeated, counters 6B is 5B count signal P7 and when the count of eight is reached, the output becomes H.

The outputs of counter 4B or 5B is supplied to set terminal S of flip-flop circuit 8B via NOR gate 7B, and the output of counter 6B is supplied to the reset terminal R of flip-flop circuit 8B. Flip-flop circuit 8B is set when the output of counter 4B or 5B becomes H and is reset when the output of counter 6B becomes H.

When flip-flop circuit 8B is set, selector 10B selects the inputs A1-A3 as the outputs Y1-Y3, and when flip-flop circuit 8b is reset, inputs B1-B3 are selected as the output Y1-Y3. Accordingly, when the repetition of signals DN or UP is detected, signals DN, UP, HD become discrimination signals DN1, UP1, HD1, respectively, of phase discriminator 130. When, however, the repetition of signal HD is detected, only the input B1 of the three inputs B1-B3 becomes H and the others become L and, therefore, phase discriminator 130 outputs only discrimination signal HD1 indicating the in-phase mode.

Reference numeral 11B denotes the reset circuit of counters 4B-6B. Any one counter, of the three counters 4B-6B, is reset by the count input of the other two counters via the OR gate b1-b3 corresponding to the counter being reset.

With a structure as described above, when the repetition of signal DN or Up is detected, flip-flop circuit 8B maintains a set state until the repetition of signal HD is detected. Accordingly, in this embodiment once the repetition of signal DN or UP is detected, the phase pull-in operation continues and, compared with the previous embodiment, the time required until the phase-locked state is reached is reduced.

In the resetting of flip-flop circuit 8B, either of signals DN, UP or HD may be selected so, similar to the FIG. 7 embodiment, if the phases of signals P4, P5 and signal TH match, it is possible to eliminate the phase pull-in operation. In other words, in this embodiment when flip-flop circuit 8B is set, signal HD can be selected as signal HD1 and, therefore, while the structure is for detecting the repetition of signal HD, when signals P4, P5 and signal TH match, the phase pulling-in operation can immediately be eliminated.

Also, after the detection of the repetition of signal HD, only signal HD1 is output until the repetition of signal DN or UP is detected so, the same as with the FIG. 7 embodiment, an apparatus that has stable characteristics in regards to noise can be provided.

In the above description, the horizontal synchronizing signal H was reproduced, but, the vertical synchronizing signal may be reproduced by changing the dividing ratio. This invention may, of course, be applied to a reference signal reproduction apparatus other than in a character broadcasting system.

As was described above, with this invention the phase state is judged by three modes and a reference signal is reproduced digitally, making the reproduction stable.

What is claimed is:

1. A reference signal reproduction apparatus, comprising:
   first counting means for dividing a reference clock by a dividing ratio and generating a count value;
   reproduction reference signal generation means for decoding said count value and generating a reproduction reference signal;
   phase comparing means for comparing the phases of said reproduction reference signal and an arriving reference signal to produce a phase comparison result;
   phase discriminating means for discriminating whether the phase of said reproduction reference signal is advanced, delayed, or in-phase in relation to that of said arriving reference signal and producing a phase discrimination result, based on the phase comparison result of said phase comparing means; and
   dividing ratio setting means for setting said dividing ratio so as to pull in the reproduction reference signal with said arriving reference signal based on the phase discrimination result of said phase discriminating means.

2. A reference signal reproduction apparatus according to claim 1, wherein said reproduction reference signal generation means comprises reset signal generation means for generating three reset signals, said three reset signals being supplied to said dividing ratio setting means, whereby said dividing ratio setting means resets said first counting means in accordance with said phase discrimination result and said three reset signals.

3. A reference signal reproduction apparatus according to claim 2, wherein said dividing ratio setting means comprises selection means for alternately selecting said three reset signals according to the phase discrimination result, thereby resetting said first counting means.

4. A reference signal reproduction apparatus according to claim 2, wherein said three reset signals have a mutual phase difference of one cycle of said reference clock.

5. A reference signal reproduction apparatus according to claim 1, wherein
   said reproduction reference signal generation means is also for generating two signals of mutually different phases as the reproduction reference signal;
   said phase comparing means is also for detecting the level of the arriving reference signal, at the timing of each of the two reproduction reference signals to produce a detection level; and
   said phase discriminating means performs phase discrimination based on the detection level of the arriving reference signal detected by said phase comparing means.

6. A reference signal reproduction apparatus according to claim 5, wherein said phase comparing means comprises two D flip-flop circuits to which the two reproduction reference signals are individually input as clock inputs and the arriving reference signal is input as a data input.

7. A reference signal reproduction apparatus according to claim 5, wherein said two reproduction reference signals have a phase difference of one cycle of said reference clock.

8. A reference signal reproduction apparatus according to claim 1, wherein said phase discriminating means is also for performing said phase discrimination each time the arriving reference signal arrives.

9. A reference signal reproduction apparatus according to claim 1, wherein said phase discriminating means comprises first phase discriminating means for phase discriminating the arriving reference signal to produce a first phase discrimination result; and second phase discriminating means for digitally integrating the first phase discrimination result of said first phase discriminating means.

10. A reference signal reproduction apparatus according to claim 9, wherein said second phase discriminating means is also for: (1) detecting advanced or delayed mode outputs from said first phase discriminating means (2) detecting a set number of repetitions of the advanced or delayed mode outputs from said first phase discriminating means, (3) when said set number of repetitions is detected, beginning the repetition detection again from an initial stage after the discrimination output has been enabled, and (4) outputting an in-phase mode discrimination result during a repetition detection period.

11. A reference signal reproduction apparatus according to claim 10, wherein said second phase discriminating means comprises:
   signal generation means for generating a prescribed phase signal for decoding the count output of said first counting means;
   second counting means for counting the signal output from said signal generation means when an advanced mode discrimination output, indicative of the advanced mode from said first phase discriminating means, is received, and outputting a signal indicating the advanced mode when a prescribed count value is reached;
   third counting means for counting the signal output from said signal generation means when a delayed mode discrimination output, indicative of said delayed mode from said first phase discriminating means, is received, and outputting a signal indicating the delayed mode when a prescribed count value is reached;
   means for outputting a signal indicating the in-phase mode when neither said advanced nor said delayed mode signal is received from said second and third counting means; and
   resetting means for resetting said second and third counting means with said signal output from said signal generation means either when said in-phase mode discrimination output is received from said first phase discriminating means, when said advanced mode discrimination output is received from said second counting means, or when said delayed mode discrimination output is received from said third counting means.

12. A reference signal reproduction apparatus according to claim 9, wherein said second phase discriminating means is also for enabling a discrimination output of said first phase discriminating means from the time that said first phase discriminating means has continuously output a prescribed number of discrimination outputs of an advanced or delayed mode, until the time that said first phase discriminating means continuously outputs a prescribed number of discrimination outputs of an in-phase mode, and for outputting a signal showing the in-phase mode, from the time that said first phase discriminating means has continuously output a prescribed number of discrimination outputs of the in-phase mode, until the time said first phase discrimination means continuously outputs a prescribed number of discrimination outputs of the advanced or delayed mode.

13. A reference signal reproduction apparatus according to claim 12, wherein said second phase discriminating means comprises:
signal generation means for decoding the count output of said first counting means and generating a prescribed phase signal;
second counting means for counting the signal output from said signal generation means when an advanced phase discrimination output is received from said first phase discriminating means and outputting a signal indicating the advanced mode when a prescribed count value is reached;
third counting means for counting the signal output from said signal generation means when a delayed phase discrimination output is received from said first phase discriminating means and outputting a signal indicating the delayed mode when a prescribed count value is reached;
fourth counting means for counting the signal output from said signal generation means when an in-phase discrimination output is received from said first phase discriminating means and outputting a signal indicating the in-phase mode when a prescribed count value is reached;
flip-flop means for setting a first level of output levels when a signal indicating the advanced mode or delayed mode is output from said second and third counting means respectively, and setting a second output level when a signal indicating the in-phase mode is output from said fourth counting means;
selection means for selecting the discrimination output of said first phase discriminating means when the output level of said flip-flop means is the first level, and outputting the same signal as the in-phase discrimination output of said first phase discriminating means when the output level of said flip-flop means is at the second level; and
resetting means for resetting, when an input is supplied to one of said second to fourth counting means, two other two of said second to fourth counting means.

14. A reference signal reproduction apparatus according to claim 1, wherein the arriving reference signal is a horizontal synchronizing signal component included in a television signal, and the dividing ratio of said first counting means is set to the same value as that obtained during an in-phase mode during a vertical synchronizing signal interval.

15. A reference signal reproduction apparatus according to claim 14, wherein the dividing ratio of said first counting means is set to the same value as in the in-phase mode by outputting the same comparison result from the phase comparing means as in the in-phase mode during the vertical synchronizing signal interval.

* * * * *